(12) United States Patent
Souparis

(10) Patent No.: US 6,761,378 B2
(45) Date of Patent: Jul. 13, 2004

(54) APPARATUS FOR MAINTAINING THE SECURITY OF A SUBSTRATE

(75) Inventor: Hugues Souparis, Nogent-sur-Marne (FR)

(73) Assignee: Hologram Industries (S.A.) (FR)

( * ) Notice: Subject to any disclaimer, the term of this patent is extended or adjusted under 35 U.S.C. 154(b) by 0 days.

(21) Appl. No.: 10/281,816

(22) Filed: Oct. 28, 2002

(65) Prior Publication Data

US 2003/0087070 A1 May 8, 2003

Related U.S. Application Data

(63) Continuation of application No. PCT/FR01/01353, filed on May 3, 2001.

(30) Foreign Application Priority Data

May 3, 2000 (FR) .............................................. 00 05650

(51) Int. Cl.$^7$ .............................................. B42D 15/00
(52) U.S. Cl. .............................. 283/91; 283/72; 283/92; 283/101; 283/901; 428/195; 428/915; 428/916
(58) Field of Search .............................. 283/72, 81, 83, 283/86, 91, 92, 94, 101; 428/901, 195, 204, 915, 916

(56) References Cited

U.S. PATENT DOCUMENTS

| | | | | |
|---|---|---|---|---|
| 4,943,093 A | * | 7/1990 | Melling et al. | ................ 283/83 |
| 5,093,184 A | * | 3/1992 | Edwards | ...................... 428/195 |
| 5,319,475 A | * | 6/1994 | Kay et al. | ........................ 359/2 |
| 6,255,948 B1 | * | 7/2001 | Wolpert et al. | ........... 340/572.8 |

FOREIGN PATENT DOCUMENTS

| | | |
|---|---|---|
| EP | 0 229 645 | 1/1987 |
| EP | 0 330 733 A1 | 1/1994 |
| EP | 0 330 733 B1 | 1/1994 |
| GB | 2 258 426 A | 2/1993 |

* cited by examiner

*Primary Examiner*—Monica S. Carter
(74) *Attorney, Agent, or Firm*—Piper Rudnick LLP

(57) ABSTRACT

An apparatus for maintaining security of a substrate having an optically verifiable mark including a partially demetallized metallic layer which forms a control graphic, a layer of optically active pigments adjacent the metallic layer, and an adhesive layer adjacent the layer of optically active pigments.

12 Claims, 2 Drawing Sheets

APPARATUS FOR MAINTAINING THE SECURITY OF A SUBSTRATE

RELATED APPLICATION

This is a continuation of International Application No. PCT/FR01/01353, with an international filing date of May 3, 2001, which is based on French Patent Application No. 00/05650, filed May 3, 2000.

FIELD OF THE INVENTION

This invention pertains to a means for maintaining the security of a substrate, and in particular a means for maintaining the security of banknotes or financial documents.

BACKGROUND

Known in the state of the art are means for maintaining security formed by narrow strips presenting an easily recognizable and verifiable visual appearance and limiting the risks of counterfeiting.

As an example, EP 229645 describes a process for creating a security paper comprising a security element incorporated in the paper in the form of a thread or a strip. The security element is situated at least locally in the thinnest regions of the paper or on the surface of the paper.

A first paper layer is formed by a first wet part of a paper machine, which is detached from the metal netting by means of a gripper band. A second layer of paper is formed on a second wet part of a paper machine. One or both of the two layers of paper have at least local regions that are thinner, representing up to 30% of the total thickness of the two layers of paper.

In order to improve this process of the prior art, U.S. Pat. No. 4,943,093 proposes creation of a security paper and a security device placed between the two surfaces of the paper as a characteristic of public security, comprising a flexible substrate with a metal layer on one surface of the substrate. The security device, which has a width smaller than 5 mm, is positioned at least partially between the surfaces of the paper. A continuous metallic track is present on at least one side of the device along its entire length. The device has demetallized parts which are permeable to light and which comprise between 10 and 50% of the surface of the device. The parts without metal placed along the length of the device form a pattern, a design or repetitive marks.

It would therefore be advantageous to further reinforce the security of such solutions by providing a security means that is easy to implement and difficult to counterfeit.

SUMMARY OF THE INVENTION

This invention relates to an apparatus for maintaining security of a substrate having an optically verifiable mark including a partially demetallized metallic layer which forms a control graphic, a layer of optically active pigments adjacent the metallic layer, and an adhesive layer adjacent the layer of optically active pigments.

BRIEF DESCRIPTION OF THE DRAWINGS

Better understanding of the invention will be obtained from reading the description below of a nonlimitative example of implementation with reference to the attached drawings in which.

DETAILED DESCRIPTION

This invention pertains to a means for maintaining the security of a substrate constituted of an optically verifiable mark comprising a partially demetallized metallic layer and an adhesive layer, characterized in that it comprises an intercalary layer comprising optically active pigments.

According to a first variant, it has an additional layer formed by a stamped varnish. According to a second variant, it is coated by a polyester film deposited on a detachment layer.

The optically active pigments are advantageously constituted of: heat-sensitive pigments, luminescent pigments, triboluminescent pigments, iridescent pigments, and/or photoluminescent pigments excitable by ultraviolet radiation.

According to one particular mode of implementation, the security-maintenance means according to the invention has an alternation of optically active pigments of different types. It is preferably implemented in the form of a narrow spool.

Figure 1:
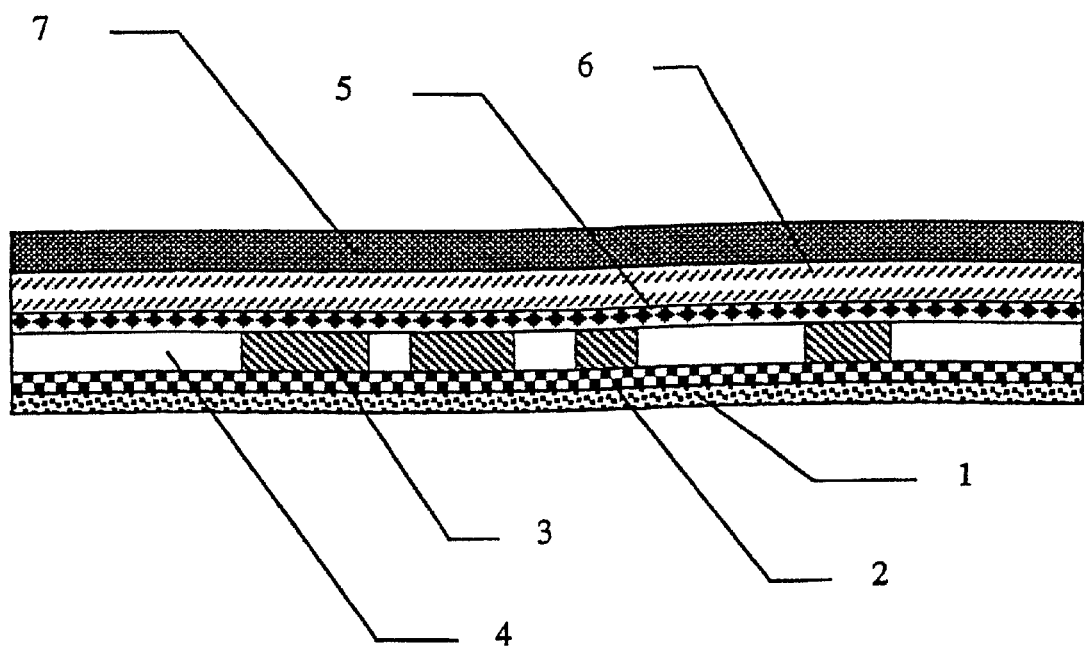
FIG. 1 is a cross-sectional view of an element according to aspects of the invention.

Turning now to the drawings, FIG. 1 represents a cross-sectional view of an element according to the invention. The marking element is formed by a bottom adhesive layer (1) for adhering onto the substrate, for example, a sheet of paper. Layer (1) is covered by a pigmented layer (2) on which is deposited alternating metallized zones (3) and demetallized zones (4). An optional layer (5) formed by a stamped varnish constitutes a transparent hologram. Layer (5) is covered by a detachment layer (6) and a polyester film (7).

The pigmented layer (2) comprises optically active pigments producing effects that are easy to observe visually, but difficult to reproduce, for example, pigments the color of which varies in relation to the temperature, incident light, orientation, gravity, under the effect of rubbing and the like.

The element according to the invention is manufactured by printing a metallic layer on the polyester preparation surface (7), for example, by vacuum deposition, and by partial demetallization of the thereby created layer. Demetallization can be implemented by a chemical bath, for example. On the layer formed by an alternation of metallized zones and demetallized zones is then deposited the pigmented layer creating recognizable patterns. Preparation is terminated by depositing an adhesive layer (1).

Figure 2:
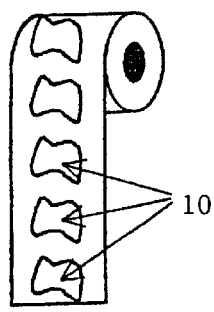
FIG. 2 is a schematic perspective view of a first variant of implementation.
Figure 3:
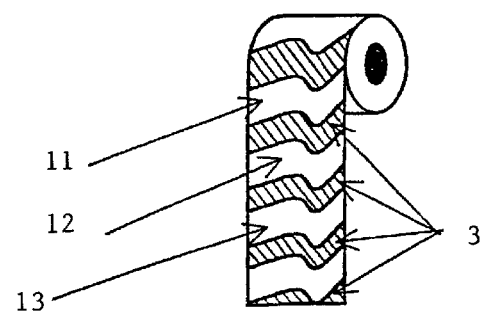
FIG. 3 is a schematic perspective view of a second variant of implementation.

FIGS. 2 and 3 represent two examples of particular implementations.

The security element is provided in the form of a narrow strip enabling placement of a marking track on a substrate. This track has an overall metallized appearance with demetallized windows (10) forming patterns recognizable by their non-shiny appearance.

The track can also have an alternating zones (11) comprising iridescent pigment(s) superposed on the metallized zones, zones (12) having heat-sensitive pigment(s) and zones (13) having UV sensitive pigment(s).

The track can be applied by simple adhesion on a substrate to provide this substrate with a particular, easily controllable optical behavior.

This makes it possible to simplify the manufacture of substrates that are secure against fraud and falsification, while making it highly difficult to counterfeit because of the combination of optical effects which are difficult to analyze and even more difficult to reproduce.

What is claimed is:

1. An apparatus for maintaining security of a substrate having an optically verifiable mark comprising:

a partially demetallized discontinuous metallic layer comprising a metallized zone and a demetallized zone, and which form a control graphic;

a layer of optically active pigments adjacent to the metallized zone and the demetallized zone of the metallic layer; and an adhesive layer adjacent the layer of optically active pigments.

2. The apparatus according to claim 1, further comprising a layer formed by a stamped varnish adjacent the metallic layer.

3. The apparatus according to claim 2, further comprising a detachment layer adjacent the layer of stamped varnish.

4. The apparatus according to claim 3, further comprising a polyester film deposited on the detachment layer.

5. The apparatus according to claim 1, wherein the optically active pigments are heat-sensitive pigments.

6. The apparatus according to claim 1, wherein the optically active pigments are luminescent pigments.

7. The apparatus according to claim 1, wherein the optically active pigments are triboluminescent pigments.

8. The apparatus according to claim 1, wherein the optically active pigments are iridescent pigments.

9. The apparatus according to claim 1, wherein the optically active pigments are photoluminescent pigments excitable by ultraviolet radiation.

10. The apparatus according to claim 1, wherein different types of the optically active pigments alternate within the layer of optically active pigments.

11. The apparatus according to claim 1, wherein the metallized and demetallized zones alternate.

12. A narrow spool comprising the apparatus according to claim 1.

* * * * *